Nov. 20, 1962 W. L. McMILLAN 3,065,357

CONSTANT CARRIER PARAMETRIC OSCILLATOR LOGIC CIRCUIT

Filed May 29, 1959

INVENTOR
WILLIAM L. McMILLAN

BY William V. Schelberg

AGENT

United States Patent Office 3,065,357

Patented Nov. 20, 1962

3,065,357

CONSTANT CARRIER PARAMETRIC OSCILLATOR LOGIC CIRCUIT

William L. McMillan, Little Rock, Ark., assignor to International Business Machines Corporation, New York, N.Y., a corporation of New York Filed May 29, 1959, Ser. No. 816,750

13 Claims. (Cl. 307—88)

This invention relates to switching circuits, and more particularly to switching circuits in a constant carrier system employing multiphase stable devices.

A multiphase stable device may be defined as a device capable of oscillating at some frequency which may be a subharmonic of the exciting frequency and which is capable of providing different output waveforms distinguishable from one another by a difference in phase relationship. One particular form of such a device is one which provides one output waveform and when triggered, or switched, provides a second output waveform distinguishable from the first which waveforms are distinguished with respect to one another by an angular phase displacement of 180°. A particular example of one form of a multiphase stable device as implemented in logical circuits capable of use in data processing systems is shown by J. Von Neumann in his Patent 2,815,488 and further described in an article entitled, "A New Concept in Computing," by R. L. Wigington, Proc. IRE, vol. 47, April 1959, pp. 516–523.

In the prior art switching circuits exemplified by the Von Neumann patent, one form of a multiphase stable device is employed as the basic element and is known as a subharmonic parametric oscillator which is capable of providing distinct outputs arbitrarily designated 0 and 1. Such circuits employ a three phase carrier system which is modulated in on-off fashion to transfer information from a first line of parametric oscillators to a second line of parametric oscillations operations in a first and a second carrier phase relationship, respectively. Modulation of the carrier accomplishes an insured forward transfer of the information and enables lower power requirements when switching of an oscillator from one to another stable state is required. While these prior art circuits are capable of performing switching operations by employing a three phase carrier modulated system, distinct disadvantages from a logical and practical standpoint are evident. From a practical standpoint by employing a three phase modulated carrier system, means are necessitated to properly synchronize the different phases of the system in performing modulation, while from a logical standpoint the devices utilized employ a single coupling means as either an input or an output but never both. Such circuits then require that information flow uni-directionally through any one coupling line by the very nature of the type carrier system employed. Further, as will be noted in these prior art circuits by reference to the above mentioned patent and article, the elements employed to transmit the information retained therein to a further similar element for performing logic have no other use, that is, these initial elements are not employed to manifest the logic desired. For example, if a simple majority type operation is to be performed, three parametric oscillator elements are employed for registering the input information and the output of each of these three devices is coupled to a fourth element which manifests the majority logic of the initial three when the phase of the excitation carrier to the first three is modulated.

It has been found that when a switching circuit is constructed in accordance with this invention, switching operations may be performed by employing a smaller number of multiphase stable devices then heretofore contemplated. Further, in accordance with an embodiment of this invention, not only may switching circuits be constructed which employ a lesser number of multiphase stable devices than heretofore contemplated bu the necessity of a system modulated carrier may be eliminated and only a constant system carrier need be provided. More specifically, a switching circuit is constructed according to the novel features of this invention by providing a plurality of multiphase stable devices each of which have a control means coupled thereto which is adapted to act as both an input and an output for the device. An appropriate switching device is serially conncted with each control means so that, when actuated, the switches place the control means and therefore the devices in parallel. If an odd numbered plurality of the switches; i.e. at least three, are actuated, then each of the devices connted in parallel are forced to assume the initial operating state of the majority. In this manner, the AND logical operator may be constructed and with inversion of any other logic performed the NOT operator is provided in one time step operation as is more specifically explained below.

Accordingly, a prime object of this invention is to provide a novel switching circuit for employing multiphase stable devices.

Another object of this invention is to provide a novel switching circuit employing multiphase stable devices wherein the carrier is not modulated.

A further object of this invention is to provide a novel switching circuit to perform a majority switching operation.

The foregoing and other objects, features and advantages of the invention will be apparent from the following more particular description of preferred embodiments of the invention, as illustrated in the accompanying drawing.

Figure 1:
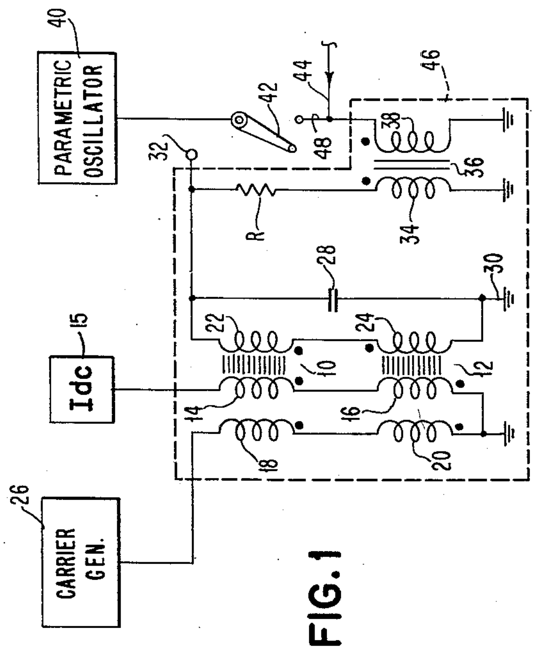
FIG. 1 is a circuit representation of a typical parametric oscillator device which may be employed in the circuit of this invention.

Referring to the FIG. 1, a typical multiphase stable device more popularly known as the "parametron" is shown, which is fully described in an article entitled "Elementary Principle of Parametron and Its Application to Digital Computers," by S. Maraga, Datamation, vol 4, No. 5, pp. 31–44, September/October 1958. In detail, the parametric oscillator, or "parametron," has a first saturable core 10 and a second saturable core 12. Each of the cores 10 and 12 is provided with a bias winding 14 and 16, a carrier winding 18 and 20 and an output winding 22 and 24, respectively. The carrier windings 18 and 20 are serially connected from ground to a carrier generator 26 which provides an alternating current carrier of a frequency $f_o$. The bias windings 14 and 16 are serially connected from ground to a constant current source 15 which is adapted to bias each of the cores to a given point on their hysteresis curve as described and shown below with reference to the FIG. 2. The output windings 22 and 24 are serially connected in opposition and have a capacitor 28 connected in parallel to provide a resonant circuit arrangement having output terminals 30 and 32, with the output terminal 30 connected to ground.

Figure 2:
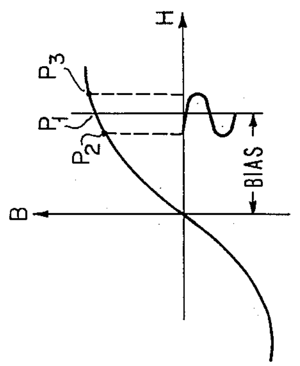
FIG. 2 is a representation of the hysteresis characteristic of the magnetic material employed in the circuit of FIG. 1.

Referring to the FIG. 2, the hysteresis characteristics required for the cores 10 and 12 employed is shown, which is a plot of flux density (B) versus applied field (H). The cores 10 and 12 are operated about a point $P_1$ on the curve determined by the bias applied by the windings 14 and 16 as energized by a constant current source 15. The carrier generator 26 in energizing the windings 18 and 20 on the cores 10 and 12, respectively, cause the cores to operate about the point $P_1$ having excursions indicated by points $P_2$ and $P_3$ on the curve. The amplitude of the applied carrier is constant and small as can be seen by the magnitude of the excursions about the point $P_1$ which are indicated by dotted lines from the curve to the abscissa H of the curve.

The value of the capacitor 28 in the FIG. 1 employed is found by consideration of the inductances of the cores 10 and 12 chosen by the slope of their curves at the point $P_1$ in the FIG. 2 so that the resonant frequency of the circuit is half that of the applied carrier *fo,* and this frequency at which the circuit resonates will hereinafter be referred to and symbolized by *fo*/2. Thus as long as the carrier generator 26 in the circuit of FIG. 1 applies an alternating current of a frequency *fo,* the output circuit of FIG. 1 will oscillate at the frequency *fo*/2.

The circuit of FIG. 1 is not only capable of oscillating at a resonant frequency of *fo*/2, but is also capable of providing output waveforms which are out of phase with one another by an angular displacement of 180°. The circuit then may be considered as having waveforms as shown in the FIG. 3.

Figure 3:
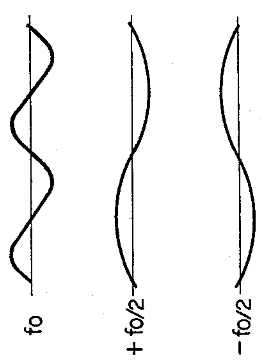
FIG. 3 is a representation of the signal waveforms provided to and capable of delivery from the circuit of FIG. 1.

Referring to the FIG. 3, an illustration of the input carrier waveform delivered by the carrier generator 26 in FIG. 1 is shown and labelled *fo,* while the waveforms which the circuit of FIG. 1 is capable of producing at its output terminal 32 are shown and labelled +*fo*/2 and −*fo*/2. The polarities represent the relative phase with respect to the first quadrant. For the purposes of clarity and ease of presentation, the different states in which the circuit of FIG. 1 is capable of operating, namely oscillating to provide an output of +*fo*/2 or −*fo*/2 as is shown in the FIG. 3 is arbitrarily termed a binary 1 and a binary 0 for representation of binary information.

Referring again to the FIG. 1, when the carrier generator 26 is first turned on, the circuit oscillates to provide a binary 1 or a binary 0 output indication on its output terminal 32. In order to augment the device into logical systems, it has been shown, in the aforementioned article, that the circuit may be coupled to similar type devices. Such a coupling is accomplished by providing a parallel circuit across the capacitor 28 having one end connected to ground and comprising a secondary winding 34 on a transformer core 36 serially connected to a resistor R having its other end commoned with the output terminal 32. A primary winding 38 is provided on the transformer core 36 having one end connected to ground and the other to a further parametric oscillator 40. For the purposes of this invention, the primary winding 38 is shown connected to the device 40 along a lead 48 and through a switch 42 which may be any suitable switching means such as a relay, a tube or a transistor. In order to switch the circuit of FIG. 1 from one operating state to another, say from the 1 state to the 0 state, a 0 state signal is introduced into the circuit by means of the device 40 introducing this opposite state into the oscillator. In order to overcome the 1 state, the power introduced from the device 40 must have a greater value than that already provided by the oscillator. Historically then, in order to overcome this aforesaid power requirement, the different bistable or parametric oscillators have a different state introduced by modulation of the carrier and introduction of the signal from a further similar device to start the circuit oscillating in the opposite state. Thus the phase of the device 40 is introduced as a small signal input to the circuit oscillator by means of the bridging network so that the phase of the device 40 is conveyed to the second device as shown in the figure. It is assumed, in the description above, that the switch 42 would be closed when the information is transferred. Further, by means of the transformer type coupling comprising the windings 34 and 38 on the core 36 not only may information be transferred from the device 40 into the circuit of FIG. 1, but the circuit itself is capable of delivering output signals through the core 36 to the device 40. Thus, the winding 34 acts as an input winding when information from the device 40 is registered in the circuit of FIG. 1 and an output winding when the state at which the circuit of FIG. 1 is to be transferred to the device 40. A further line 44 is shown commoned with one end of the winding 38 which similarly may provide an information input to the circuit of FIG. 1 under control of a switch similar to the switch 42 (not shown).

Figure 4:
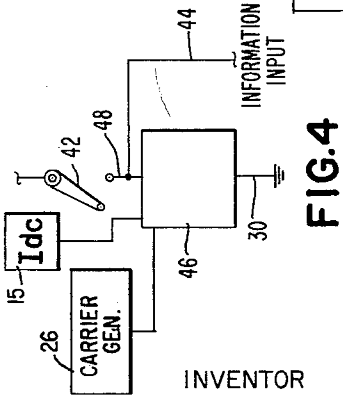
FIG. 4 is a schematic representation of the circuit of FIG. 1 in block form.

The circuit of FIG. 1 is schematically represented in block form in FIG. 4 which shows a box 46 representing that portion of the circuit of FIG. 1 enclosed by the dotted lines, the carrier generator 26, the constant current source 15, the ground terminal connection 30, the switch 42 serially connected in line 48 with the further information input line 44 connected thereto. Since, as stated above, the transformer coupling provided by the windings 34 and 38 on the core 36 may act to provide inputs to the circuit of FIG. 1 or output signals therefrom, the line 48 with the series connected switch 42 may act as both an input and an output for the circuit and therefore will hereinafter be referred to as the control means of the multiphase device 46. Information in terms of a binary 1 or 0 may be registered in the device 46 by means of the line 44 as shown in the FIG. 1 or provision of a further winding similar to the winding 38 on the core 36 connected with the line 44 or even another parallel coupling circuit as described above. After the information has been entered into the device 46 the line 44 may be disconnected by means of a switch similar to the switch 42. The line 48 then acts as a further control upon the device 46 since, as stated above, it is now adopted to act as both an input and output of the device.

Figure 5:
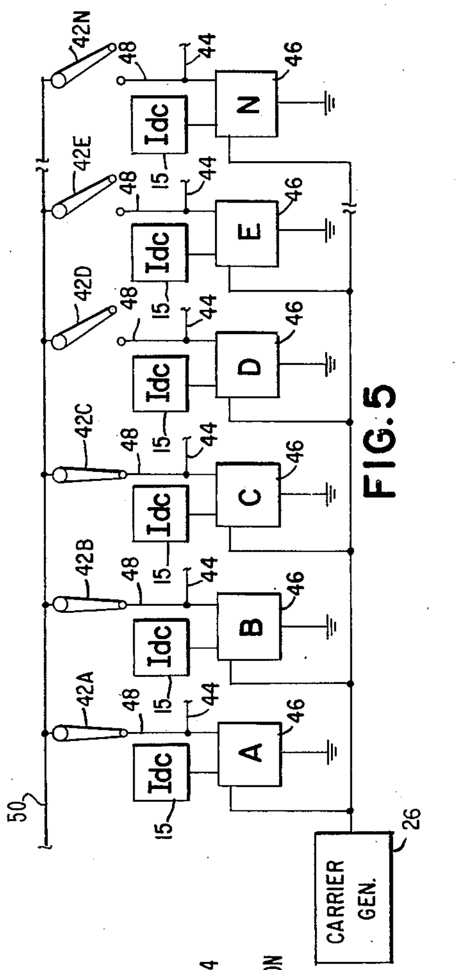
FIG. 5 is a novel circuit arrangement of an embodiment of this invention.

Referring now to the FIG. 5, a number of parametric oscillators 46 are shown connected in parallel and labelled A, B, C, D, E . . . N, with switches labelled 42A, 42B, 42C, 42D, 42E . . . 42N serially connected in the control lines 48, respectively, to a signal time 50. A carrier generator 26 is multiplied to devices A through N; constant current sources 15 are connected to devices A through N, respectively.

Initially, consider the devices A, B and C of the FIG. 5 as operating in either the 1 or 0 state and the switches 42A, 42B and 42C are open. If, at a time $t_1$, the switches 42A, 42B and 42C are closed simultaneously, the quantities being switched are made equal to each other and it is obvious that the devices A, B and C cannot continue to oscillate in their original phases since the quantities being switched are not equal to each other. The characteristic behavior of the devices A, B and C is such that the amplitude of oscillation tends to approach a steady state value in one phase or the other, i.e. either 0 or 1, Since the quantities of oscillation are made equal, i.e. the voltage, by closure of the switches 42, all the devices A, B and C will approach the normal steady values in the same phase. If the oscillations were identical, all 0 or 1, the phase of all the devices A, B and C at a times $t_2$ after the transient period when the switches 42A, 42B and 42C were closed at time $t_1$, is uniquely determined to be the phase of the majority of the devices A, B and C before the time $t_1$. In the logical sense, if the phase of each device A, B and C before the time $t_1$ is considered to be an input quantity and the phase 0 or 1 of any of the devices A, B or C at the time $t_2$ is considered to be the output quantity, it is seen that a logical majority function has been performed.

To be more specific, consider again the three devices A, B and C as connected through their common switches 42A, 42B and 42C to the signal line 50. The state of of the devices A, B and C may be considered as corresponding to three input variables which, as stated above, is introduced by means of similar devices connected via the information input line 50 to the ground side of the switches 42A, 42B and 42C. If the three switches 42A, 42B and 42C are turned on simultaneously, the three oscillators A, B and C will assume a phase, or state, described by the Boolean expression.

$$ABC+\bar{A}BC+A\bar{B}C+AB\bar{C}$$

Therefore, if a majority of the devices A, B and C are in the 1 state when the switches 42A, 42B and 42C are closed at the time $t_1$, at the time $t_2$ all the devices assume the 1 state of operation to perform majority type logic. After the time $t_2$, outputs may be taken from each of the devices A, B or C by coupling to the control line 48 on the ground side of the switches 42 allowing branching of the output condition of the operation performed. Thus a majority function plus output branching is immediately available from the arrangement of FIG. 5.

If a further majority function is desired employing the output condition of the above majority logic with variable inputs provided to the devices D and E, the switch 42A or 42B or 42C may be closed simultaneously with the switches 42D and 42E of the devices D and E. Thus the output of the first majority logic may be combined with two further input variables to perform a further majority type function. If, however, the majority logic performed by the previous switching operation involving devices A, B and C were to represent a given expression requiring insertion into a further device, say E, on the line, the switches 42B, 42C and 42E would be closed simultaneously to connect the devices B, C and E to the line 50. Since, due to the previous logic performed, the devices B and C are in the same state; i.e. both either in the 0 or 1 state, this state is forced upon the device E and it too assumes the majority state, 0 or 1. By the same type of reasoning, it is obvious that the output indication of the original majority logic may be shifted down the signal line 50 in serial fashion. Such a serial shifting operation is performed by first closing the switches 42B and 42C and 42D. Since the devices B and C are both in the same state, either both in the 0 or 1 state due to the previous majority operation, this majority state is forced into the device D. Thereafter, the switches 42B may be opened and the switches 42C, 42D and 42E closed. Again, since the devices C and D are both in the same state, 0 or 1, the device E is forced into this majority state. Thus information may be shifted down the signal line 50 in serial fashion by sequential operation of the switches 42. Further, this information may also be shifted in reverse order by reversing the sequential operations of the switches 42.

As described above, the majority type logical function is achieved whose output may be branched or, by utilizing the same type of operation, the circuit of FIG. 5 may act as a reversible shifting register. It is well known that the basic logical functions required to construct all other logical operators is the logical operator performing the AND function and the logical operator for performing the NOT, or INVERSION, function.

Simply, the AND function is provided by establishing the device A of FIG. 5 in the 0 state and having two variable inputs to the devices B and C to set these latter devices in the 0 or 1 state. If both the devices B and C are left in the 1 state before closure of the switches 42A, 42B and 42C, then upon closure of these latter switches, the 1 state is forced into the device A as the majority function of the three and an output may thereafter be taken from either of the devices A, B or C directly and/or mixed into the signal line 50 for further logical operations as described above. Since both the devices were initially set into the 1 state the output of the operator is 1 and the function of AND is performed. If, with the device A set in the 0 state either one or both of the devices B and C is set in the 0 state before closure of the switches 42A, 42B and 42C, then the majority of the three is 0 and each device assumes the 0 stable state of operation.

The NOT or INVERSION operator is provided by reversal of the output phase. Considering the FIG. 1 again, it may be seen that the device 40 is coupled to the circuit oscillator shown by means of a primary winding 38 coupled to the secondary winding 34 by means of the core 36. If the polarity sense of the primary winding 38 or the secondary winding 34 is reversed then, a 0 output from the device 40 appears as a 1 input to the oscillator circuit shown. Accordingly, one of the devices shown in the FIG. 5 may have its secondary winding reversed, say the device D, and inversion of any output would then be accomplished by connecting this device to the line 50 by means of its switch, 42D, at the desired time. For instance, when serial information transfer occurs, as discussed above, if a previous majority operation employing the devices A, B and C left each in the 1 state, then inversion of this 1 output is accomplished by closure of two of the switches 42A, 42B and 42C and the switch 42D. Inversion may also be accomplished by considering reversal of the primary winding 38 of FIG. 1 so that if one of the devices A, B . . . N is initially forced into the 0 or the 1 state, its output appears in inverse form.

While an embodiment of this invention has been described by employing parametric oscillators, such devices as relaxation oscillators, triggers and the like will work equally as well just so long as the requirements as to phase operation and the like are fulfilled. Further, the circuit operation described above considers multiphase stable devices which operate to provide similar magnitude output signals for uniformity in such arrangements, but devices capable of providing an output signal of twice the magnitude may be incorporated and thus the necessity in a given switching operation of an odd numbered plurality vanishes.

While the invention has been particularly shown and described with reference to preferred embodiments thereof, it will be understood by those skilled in the art that various changes in form and details as discussed above may be made therein without departing from the spirit and scope of the invention.

What is claimed is:

1. In a system, a plurality of parametric oscillator devices each including resonant circuit means, first means connected to said devices for continuously supplying a constant carrier signal to support said resonant circuit means in a first or a second phase stable state, and control means for simultaneously interconnecting respective resonant circuits means of an odd-numbered plurality of said devices to combine output signals of said respective resonant circuit means, said control means being of sufficiently low impedance to apply said combined signals to each of said respective resonant circuits means to force each of said respective resonant circuit means to assume a same phase state as the majority of said respective resonant circuit means while said first means is operative to continuously supply said carrier signal.

2. In a system as defined in claim 1 wherein said control means includes transformer means associated one with each of said respective resonant circuit means, each of said transformer means including a first winding connected to said associated resonant circuit means and a second winding, and additional means for connecting said second windings in parallel.

3. In a system as defined in claim 2 wherein the phase relationship of said first and said second windings of at least one of said transformer means is reversed.

4. In a system, a plurality of parametric oscillator devices each including resonant circuit means, means for continuously supplying a constant carrier signal to each of said devices to support said resonant circuit means in either a first or a second phase stable state, control means coupled one to each of said resonant circuit means, first means for establishing each of said resonant circuit means in a particular one of said phase stable states, and means operative subsequent to said first means for simultaneously interconnecting an odd-numbered plurality of said control means to combine output signals coupled from respective ones of said resonant circuit means, each of said control means and said interconnecting means having a sufficiently low impedance to apply said combined signals to each of said respective resonant circuit means to force each of said respective resonant circuit means to assume a same phase stable state as the majority of said respective resonant circuit means while said carrier signal is continuously supplied.

5. In a system, a plurality of parametric oscillator devices each including resonant circuit means, means for continuously supplying a constant carrier signal to each of said devices to support each of said resonant circuit means in either a first or a second phase stable state, control means effective both as an input and an output coupled one to each of said resonant circuit means, signal line circuit means, and switching means for simultaneously interconnecting an odd-numbered plurality of said control means in parallel along said signal line circuit means to additively combine output signals coupled from respective ones of said resonant circuit means therealong, said interconnected control means having a sufficiently low impedance to direct said combined signals to said respective resonant circuit means as phase determining signal to force each of said respective resonant circuit means to assume a same phase stable state as the majority of said respective resonant circuit means while said carrier signal is continuously supplied.

6. In a system, a plurality of parametric oscillator devices each including resonant circuit means, means for continuously supplying carrier signal energy to support said devices in a first or a second phase stable state, control means coupled one to each of said resonant circuit means, means connected to said control means for initially determining the phase state of respective ones of said resonant circuit means, a signal line circuit, and switching means operative subsequent to said determining means for simultaneously connecting an odd-numbered plurality of said control means to said signal line circuit to combine output signals of each of said respective resonant circuit means along said signal line circuit, said connected control means having a sufficiently low impedance to couple said combined signals along said signal line circuit to said respective resonant circuit means to force said respective resonant circuit means to assume a same phase stable state as the majority of said respective resonant circuit means while said carrier signal energy is continuously supplied.

7. In a system, a plurality of parametric oscillator devices each including resonant circuit means, means for continuously supplying a constant carrier signal to support each of said resonant circuit means in a first or a second phase stable state, control means coupled one to each of said resonant circuit means for directing phase determining signals to said resonant circuit means and also output signals from said resonant circuit means so as to define an input and an output for said each resonant circuit means, first means for supplying phase determining signals along said control means to establish a particular phase stable state for each of said resonant circuit means, second means for successively interconnecting odd-numbered pluralities of said control means simultaneously and in predetermined sequence to couple corresponding ones of said resonant circuit means to combine output signals from said coupled resonant circuit means along said second means, said interconnected control means having a sufficiently low impedance to apply said combined signals to each of said corresponding resonant circuit means as a phase determining signal to force said corresponding resonant circuit means to assume the same phase stable state as the majority of said corresponding resonant circuit means while said carrier signal is continuously supplied.

8. In a system as defined in claim 7 wherein said second means includes additional means for disconnecting a number of said interconnected control means and simultaneously connecting a same or lesser number of others of said control means to remaining ones of said interconnected control means to define a next successive odd-number plurality whereby the majority manifestation originally performed is transferred.

9. In a system, a plurality of parametric oscillator devices each having resonant circuit means, means connected to said devices for continuously supplying a constant carrier signal to support said resonant circuit means in either a first or a second phase stable state, control means effective both as an input and an output and coupled to each of said resonant circuit means, means coupled to said control means for registering binary information by establishing a particular phase state in said coupled resonant circuit means, and means for simultaneously interconnecting a predetermined number of said control means in parallel to combine output signals from corresponding ones of said coupled resonant circuit means, said control means having a sufficiently low impedance to feed back said combined signal to said corresponding resonant circuit means and force said corresponding resonant circuit means to assume a same phase state as that of the majority of said corresponding resonant circuit means while said carrier signal is continuously supplied.

10. In a system as defined in claim 9 wherein said control means comprises transformer means having a primary and a secondary winding.

11. In a system as set forth in claim 9 wherein the phase state of at least one of said resonant circuit means is established only by said register means.

12. In a system as defined in claim 9 wherein said predetermined number of devices is an odd-numbered plurality.

13. In a system as defined in claim 10 wherein the control means coupled to one of said predetermined number of connected devices is arranged so that the phase relationship of the primary and secondary winding is reversed.

References Cited in the file of this patent

UNITED STATES PATENTS

| | | |
|---|---|---|
| 2,815,488 | Neumann | Dec. 3, 1957 |
| 2,992,398 | Sterzer | July 11, 1961 |

FOREIGN PATENTS

| | | |
|---|---|---|
| 778,883 | Great Britain | July 7, 1957 |

UNITED STATES PATENT OFFICE

CERTIFICATE OF CORRECTION

Patent No. 3,065,357

November 20, 1962

William L. McMillan

It is hereby certified that error appears in the above numbered patent requiring correction and that the said Letters Patent should read as corrected below.

Column 2, line 4, for "bu" read -- but --; line 17, for "connted" read -- connected --; line 55, for "Maraga" read -- Muroga --; same line, for "vol 4" read -- Vol. 4 --; column 4, line 50, for "multiplied" read -- multipled --; line 63, for "1," read -- 1. --; line 68, for "times" read -- time --; column 8, line 32, after "pled" insert -- one --; line 64, for "Neumann" read -- Von Neumann --.

Signed and sealed this 26th day of November 1963.

(SEAL)
Attest:

ERNEST W. SWIDER

Attesting Officer

EDWIN L. REYNOLDS

Acting Commissioner of Patents